United States Patent [19]

Stamp

[11] Patent Number: 4,545,273
[45] Date of Patent: Oct. 8, 1985

[54] PARTITION WALL BATTERY BOX PUNCHER

[76] Inventor: Thomas B. Stamp, Laurentides, Haymes Rd., Cleeve Hill, Cheltenham, Gloucestershire, England

[21] Appl. No.: 549,728

[22] Filed: Nov. 8, 1983

[51] Int. Cl.[4] .............................................. B26F 1/02
[52] U.S. Cl. ...................................... 83/184; 83/516; 83/598; 83/601; 83/605; 83/925 R
[58] Field of Search ................. 83/516, 517, 519, 605, 83/597, 903, 925 R, 184, 598, 601

[56] References Cited

U.S. PATENT DOCUMENTS

| | | | |
|---|---|---|---|
| 499,807 | 6/1893 | Thomas | 83/605 X |
| 3,154,992 | 11/1964 | Sahlin | 83/605 X |
| 3,485,131 | 12/1969 | Brolund | 83/516 X |
| 3,605,535 | 9/1971 | Love et al. | 83/516 X |
| 3,667,333 | 6/1972 | Flynn, Jr. | 83/516 X |
| 3,982,457 | 9/1976 | Berry | 83/516 |
| 4,136,592 | 1/1979 | Beatty | 83/516 |

FOREIGN PATENT DOCUMENTS 1484268  9/1977  United Kingdom ................. 83/903

Primary Examiner—Frank T. Yost
Attorney, Agent, or Firm—Young & Thompson

[57] ABSTRACT

A multiple punching machine for punching out holes in the partition walls of a battery box. To accommodate all the different sizes and shapes and dimensions of battery boxes, the machine has multiple punching heads which are independently operated and independently positioned longitudinally, laterally, and vertically. Each head consists of a pair of pivoted punch jaws of small transverse dimensions to fit into small battery cells and each head is operated by an independent pneumatic ram with the piston rod moving along the length of the limbs of the jaw to minimize transverse diemensions. By using independent heads the reaction force at each punch is absorbed thus eliminating a heavy frame.

6 Claims, 7 Drawing Figures

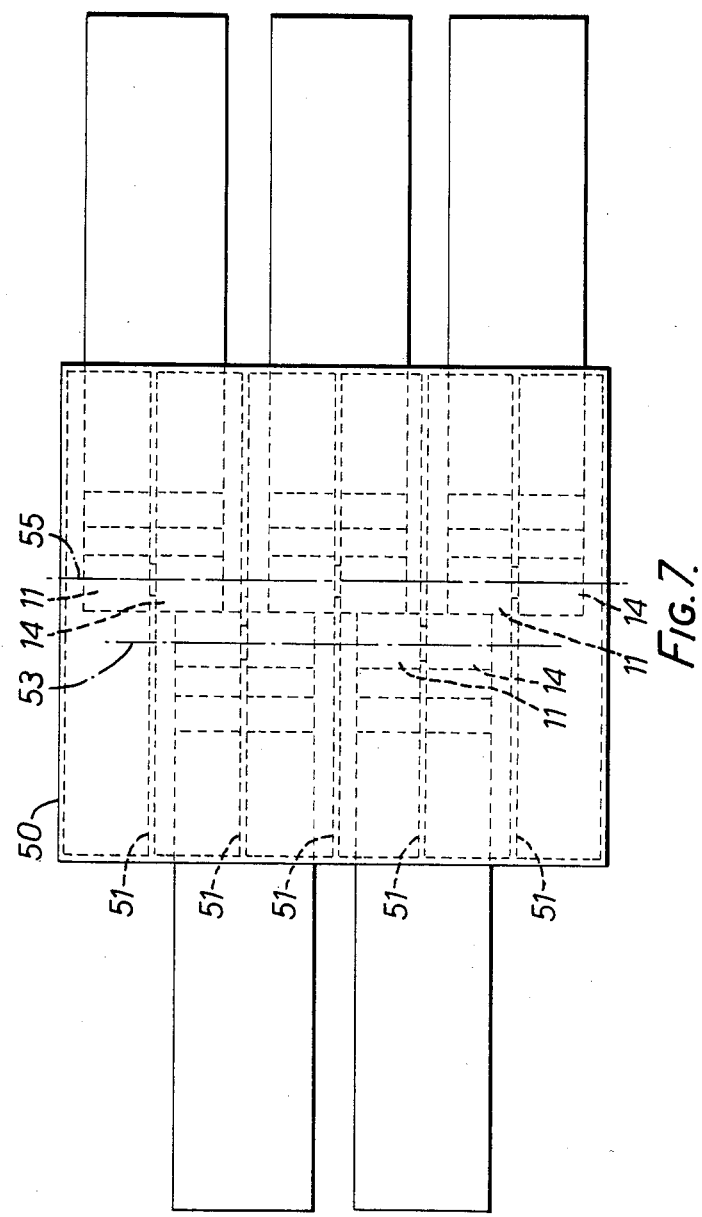

PARTITION WALL BATTERY BOX PUNCHER

This invention relates to apparatus for punching holes in the case of an electrical accumulator, hereinafter referred to for convenience as a "battery box". These boxes are conventionally moulded in synthetic plastics with integral transverse partition walls separating the cells of the battery. The lead plates in the different cells need to be electrically connected and the conventional method involves a metal connector which extends through the partition from one cell to the next.

Difficulties are experienced in providing efficient connectors and in making the joints fluidtight, and it is particularly difficult to form openings through the partition walls which will be accurate and clean, especially since the dimensions of each cell vary from one battery to another and are usually very restricted. Hence it is an object of the invention to provide an improved punching mechanism which will overcome some of the existing problems.

Broadly stated the invention consists in apparatus for punching holes in the walls of accumulator cases or the like comprising a support frame and a plurality of punching jaw pairs adjustable lengthwise along a guide rail, each jaw pair being operable by an individual actuator.

According to a preferred feature of the invention the apparatus includes two parallel guide rails each carrying a number of such jaw pairs, the guide rails being adjustable towards and away from one another. Preferably also the guide rail or rails are also adjustable vertically, i.e. transverse to the plane containing the two rails.

One of the difficulties in such mechanisms arises from the very limited dimensions available and according to another preferred feature of the invention each jaw pair comprises a pair of elongated pivoted jaws and the actuating mechanism comprises a fluid ram acting in a direction towards the pivot of the jaws. The actuating ram may act on the tails of the two jaws through a cam mechanism. Also on account of the limited space the transverse dimensions of the ram are preferably approximately equal to the transverse dimensions of the jaw pair.

Thus in a preferred punching machine according to the invention it is possible to adjust the individual jaw pairs to suit any battery box dimensions, whereas in existing punching machines the positioning of the punches is suitable only for one particular construction of battery box and cannot be modified. A preferred machine according to the invention is readily adjustable to accommodate cells of different widths and also will accommodate different gaps between the punched apertures in alternate partitions and furthermore can also be adjusted simply for different vertical dimensions.

The invention may be performed in various ways and one specific embodiment with a number of modifications will now be described by way of example with reference to the accompanying drawings, in which:

FIG. 7 is a plan view illustrating the position of the punches in relation to a battery box.

Figure 4:
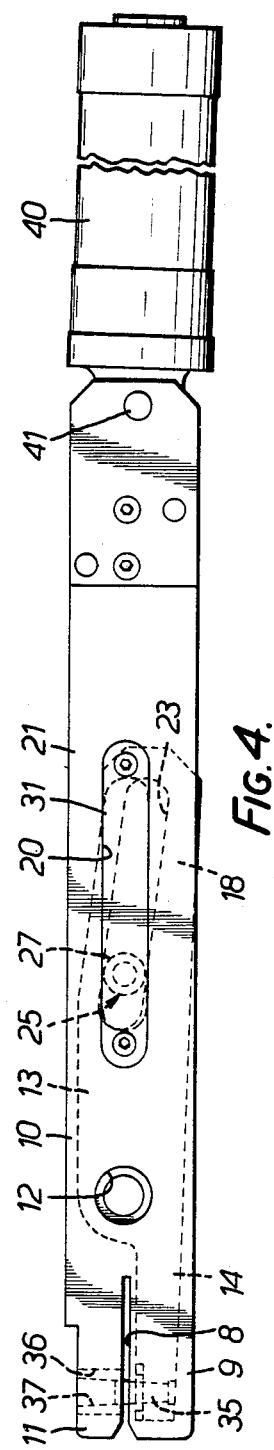
FIG. 4 is a side elevation of one of the punches.
Figure 5:
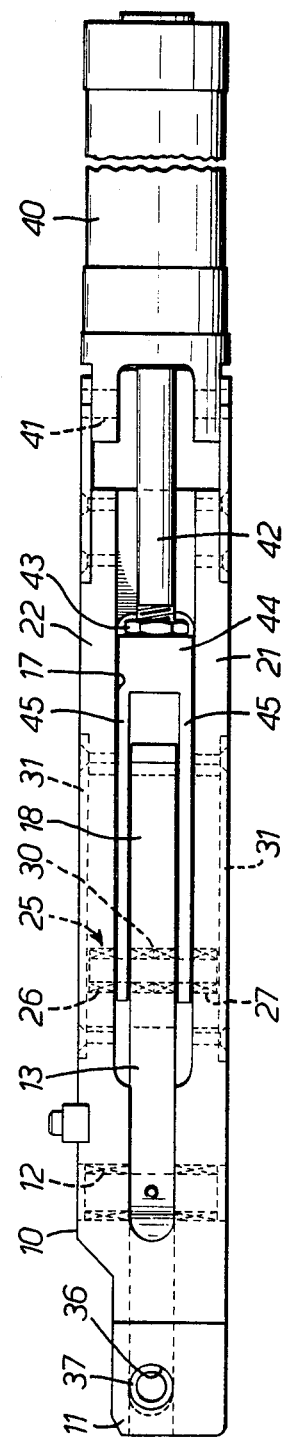
FIG. 5 is an end view of the punch.

Referring first to the construction of the individual punches illustrated in FIGS. 4 and 5, each jaw pair comprises a heavy metal casting 10 having an upper projection 11 designed to act as one jaw of the pair. It also has a fixed lower projection 9 providing a gap 8 to receive the partition wall of the battery box in which an aperture is to be punched. The member 10 also has a transverse bore 12 to receive a bearing for a relatively movable member 13 having a forward projection 14 which acts as the other jaw of the pair. The casting 10 has a transverse slot 17 in which is received the tail end 18 of the second member 13 and the member 10 also has transverse slots 20 perpendicular to the slot 17 and extending through the two limbs 21,22 on either side of the slot 17. The tailpiece 18 of the second element 13 has an elongate slot 23 and a travelling roller assembly 25 is provided with rollers 26,27 at opposite ends which are accurate fits within the slots 20 of the limbs 21,22 while a central bearing roller 30 is a close fit within a slot 23 in the tailpiece 18. The slots 20 in the side limbs 21,22 are closed and protected by cover plates 31. The forward projection 14 of the second jaw member 13 is formed with a recess to receive and locate a punching tool 35 and the projection 11 on the first element 10 has a through opening 36 to receive and locate a die 37. The punch and die are accurately formed to punch out clean accurate holes in the walls of the battery box and can readily be removed and replaced by punch and die pairs of different dimensions.

The punch jaws are actuated by an individual fluid actuator in the form of a pneumatic or hydraulic ram 40 comprising a cylinder pivotally attached at 41 to the element 10 of the punch jaws, and an internal piston, not shown, connected to a piston rod 42 attached at 43 to an actuator fork 44. At its forward end the two limbs 45 of the fork engage the bearing assembly 25 to create longitudinal movement of the bearing. Hence it will be seen that longitudinal movement causes small pivotal movements of the jaw member 13 in relation to the first jaw member 10.

Figure 1:
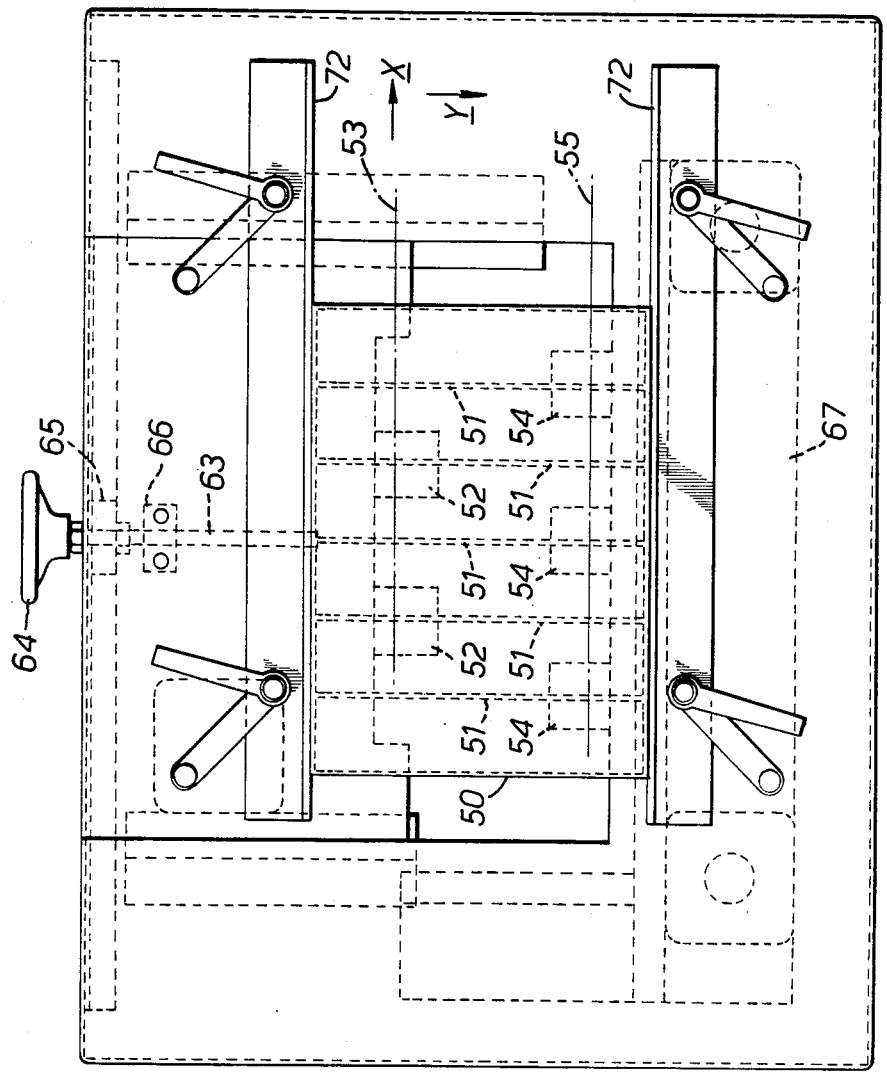
FIG. 1 is a plan view of a punching machine according to the invention.
Figure 2:
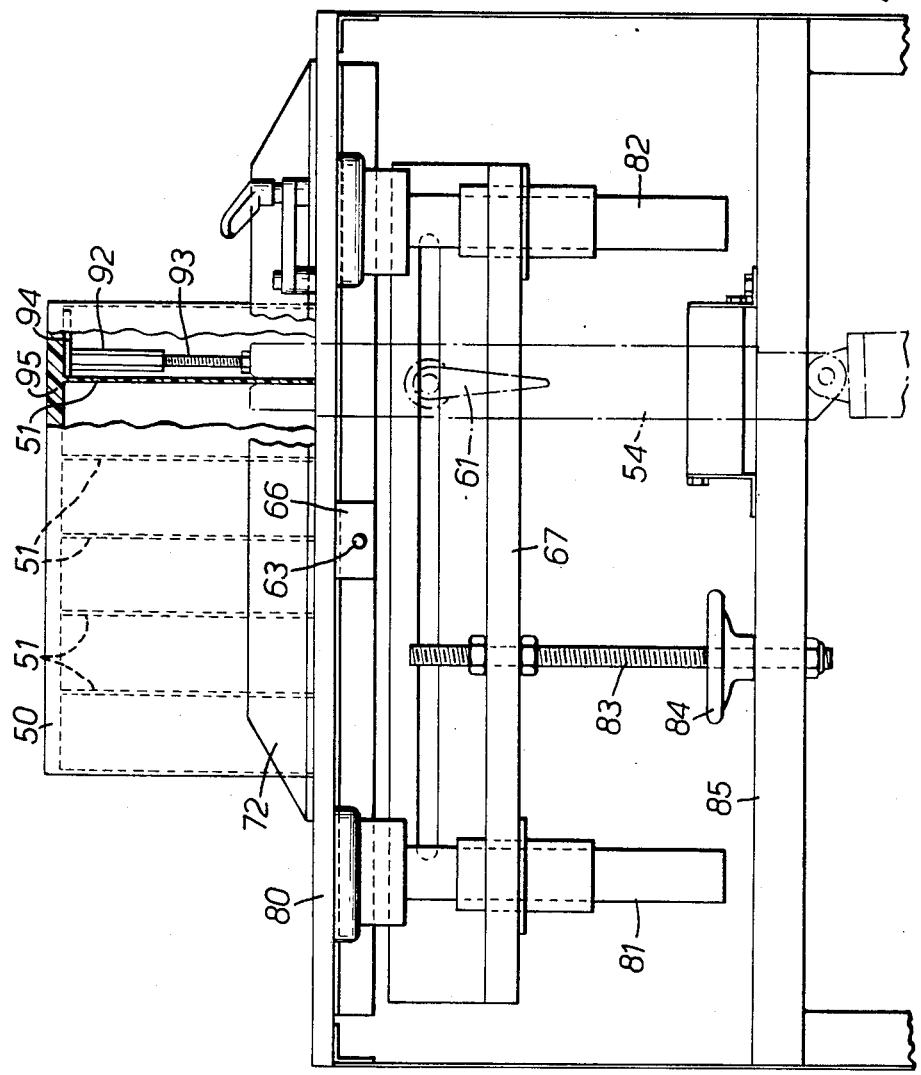
FIG. 2 is a side elevation of the machine.
Figure 3:
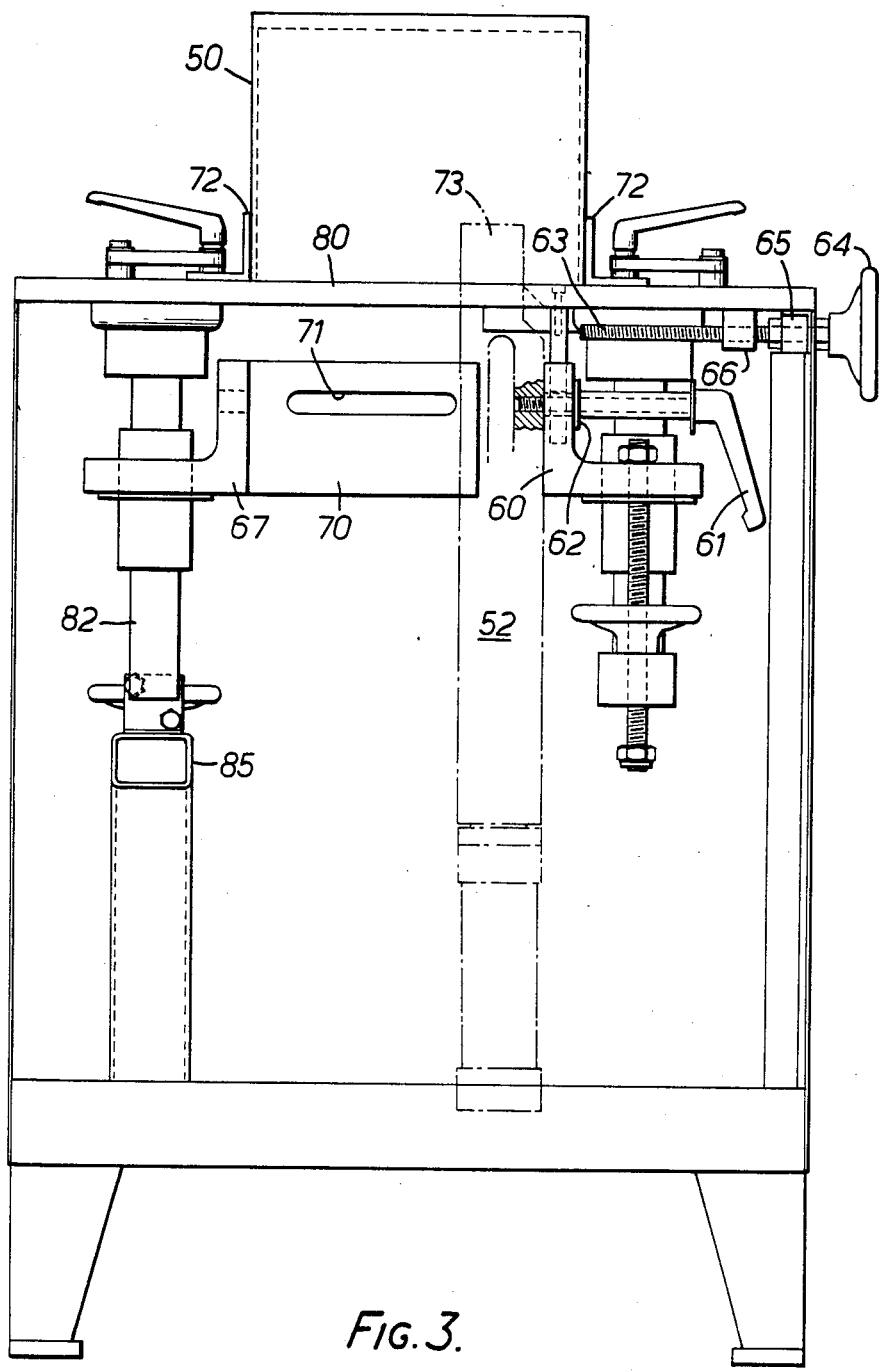
FIG. 3 is an end view of the same machine.

Referring now to the complete punching machine, illustrated in FIGS. 1,2 and 3, the illustrated battery box 50 is of the usual rectangular shape and has five internal partition walls 51 dividing the box into six cells. The machine is designed to punch clean holes simultaneously through these five parition walls and, as illustrated in FIG. 1, the machine includes five jaw pairs, two indicated at 52 being aligned on a first row 53, while three indicated at 54 are aligned on a second row 55. In order to accomodate battery boxes at different dimensions means are provided to adjust the jaws in each row in the direction of the arrow X and also to adjust the positioning of each of the two rows in the direction of arrow Y. In addition, for a reason to be clarified, means are provided for adjusting the jaws vertically.

As illustrated in FIG. 3, each of the jaw pairs 52 is adjustably mounted on a horizontal guide rail 60 and can be adjustably positioned on the guide rail by means of a manual clamp 61, which exerts a frictional grip via a clamp washer 62. The guide rail 60 can itself be adjusted backwards and forwards by means of a threaded adjusting rod 63 attached to a wheel 64 at the front of the machine, the rod being anchored to the frame of the machine at 65, and also engaging a screw block 66 connected to the sliding support for the rail. A similar adjusting mechanism may be provided for a second rail 67 located at the back of the machine to carry the punch jaws of the second row 55.

In some cases it may be required also to punch holes in the side walls or end walls of the battery box and for this purpose the machine may include a transverse guide plate 70 with a slot 71 to admit one or more further punch jaws to be positioned and adjusted in the same way. FIG. 3 also illustrates the adjusting and clamping mechanism for a pair of guide rails 72 positioned on the top of the machine on either side of the central aperture through which the upper end 73 of the punching jaws extend. These rails serve to locate the side walls of the inverted battery box and are adjustable to suit different box sizes.

Vertical adjustment of the punching jaws is provided in relation to the upper surface 80 of the top plate to determine the vertical positioning of the punched holes. This is achieved by mounting the guide rail 60 on a pair of vertical guide shafts 81,82 and providing a central vertical adjusting rod 83 actuated by a manual screw adjustor 84 engaging a fixed transverse frame bar 85. A similar vertical adjusting mechanism is provided for the rail at the back of the machine.

Figure 6:
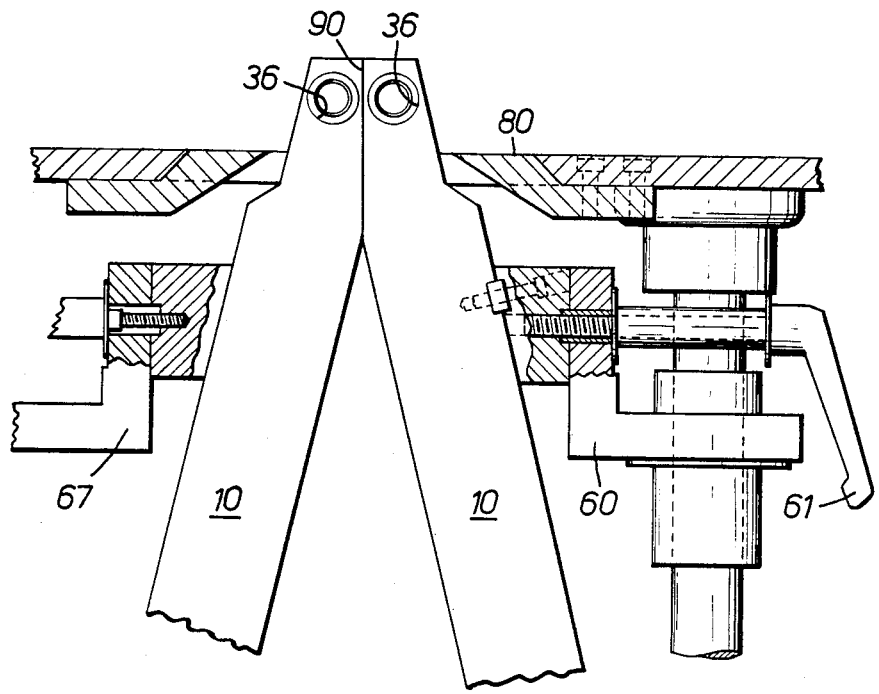
FIG. 6 is an end view of a modified form of punch.

As is apparent the width of the individual cells in the battery box may be very limited and in some cases the two rows of punched apertures 53, 55 may be so closely positioned that there is insufficient room to accommodate the punching jaws. One jaw of one pair would interfere with the jaw of another pair within the same cell, as illustrated in FIG. 7. To eleviate this problem the jaws may be chamfered off towards their upper ends, as illustrated in FIG. 6. Here the adjacent faces of the two members 10 are cut back on an incline, as illustrated at 90, thus allowing the extreme upper parts to be moved closer together and so allowing holes to be punched on rows 53,55 which are closer together though not in full alignment.

The vertical position of the punched holes may be determined by reference to the upper surface of the top plate 80, as described above, but in some cases the positioning of the holes is determined with respect to the bottom of the battery box itself. For this purpose, as illustrated in FIG. 2, one jaw of each pair may be provided with an adjustable upward projecting pillar 92 with a screw threaded adjusting section 93, the top end 94 being designed to abut against the actual bottom wall 95 of the battery box. This determines the position of the box in relation to the punching jaws and so determines the vertical positioning of the punched holes.

It will be seen that since all the fluid actuators and the jaw pairs are independent there is no requirement for a heavy frame to locate the individual abutments of each punching jaw. Indeed, in theory it is possible for each jaw pair to float horizontally since it includes its own action and reaction members. All the individual fluid rams are connected to a common fluid actuating system (not illustrated) so that the jaws are all actuated simultaneously, thus producing high-speed accurate punching which can be easily adapted to battery boxes of different designs and dimensions.

I claim:

1. Apparatus for punching holes in the partition walls of an accumulator case, comprising a support frame, a horizontal support rail carried by said frame, a plurality of hinged punching jaw pairs mounted on and adjustable lengthwise along said guide rail, an individual fluid actuator connected to each individual jaw pair, each actuator comprising a piston and cylinder aligned on an operating axis perpendicular to the respective hinge axis of the associated jaw pair, and in which said rail is adjustable in a direction perpendicular to its length and the hinge axis of each jaw pair is horizontal and perpendicular to the length of said rail.

2. A punching apparatus according to claim 1, having two parallel guide rails each carrying a number of such jaw pairs, the guide rails being adjustable towards and away from one another.

3. A punching apparatus according to claim 1, in which each guide rail is also adjustable vertically, transverse to the plane containing the two rails.

4. A punching apparatus according to claim 1, in which each jaw pair comprises a pair of elongated pivoted jaws and the actuating mechanism comprises a fluid ram acting in a direction towards the hinge axis of the jaws.

5. A punching apparatus according to claim 4, in which each jaw has a tail on the remote side of the jaw hinge axis, and the actuating ram acts on the tails of the two jaws through a cam mechanism.

6. Apparatus according to claim 4, in which the transverse dimensions of the ram are approximately equal to the transverse dimensions of the jaw pair.

* * * * *